Aug. 2, 1966   H. A. McINTOSH ET AL   3,264,421
SAFETY CONTROL FOR GAS VALVE AND THE LIKE
Filed Aug. 2, 1963   2 Sheets-Sheet 1
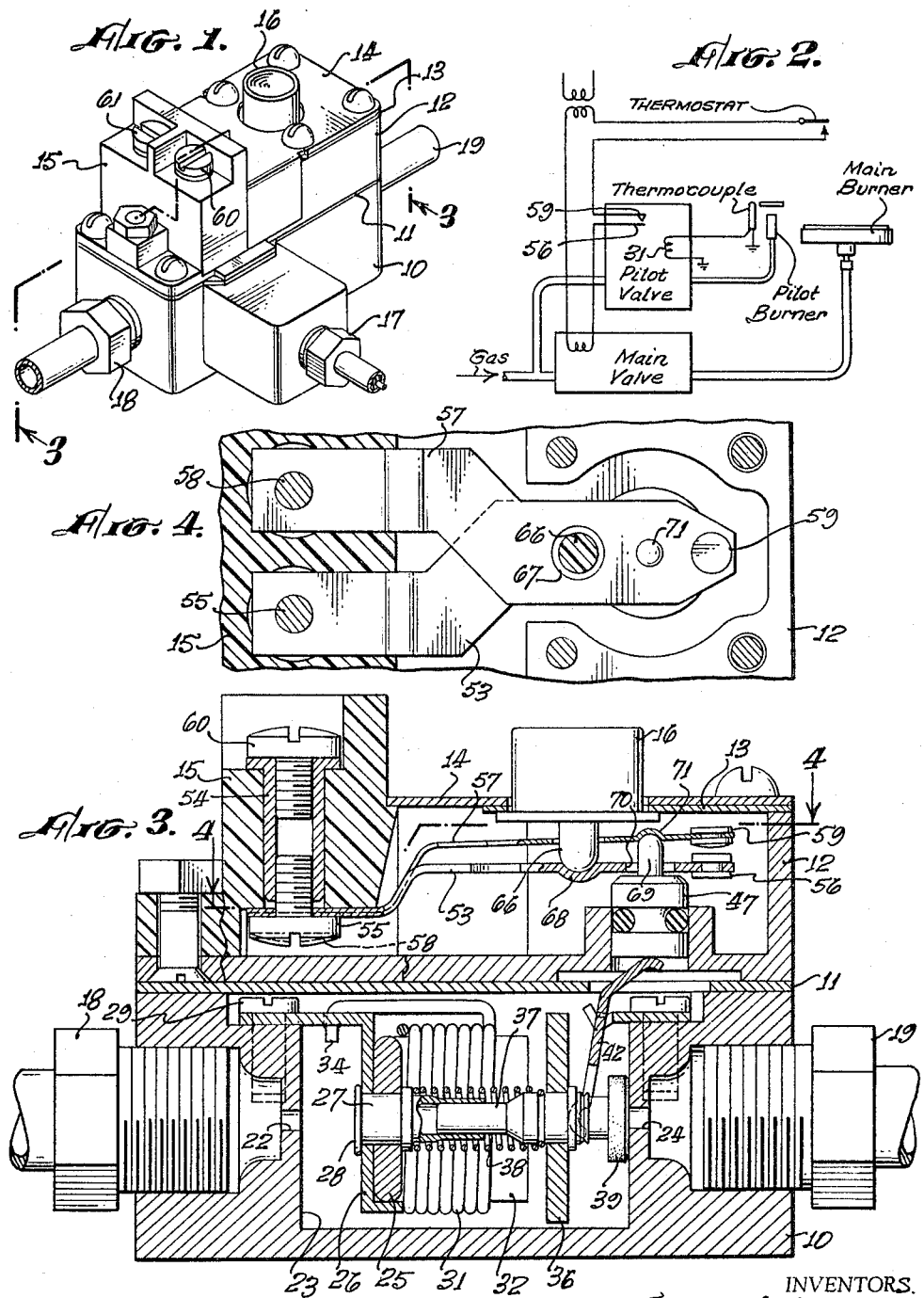
INVENTORS.
HAROLD A. McINTOSH,
HOUSTON REHRIG,
BY THEIR ATTORNEYS.
HARRIS, KIECH, RUSSELL & KERN.

Aug. 2, 1966  H. A. McINTOSH ET AL  3,264,421
SAFETY CONTROL FOR GAS VALVE AND THE LIKE
Filed Aug. 2, 1963  2 Sheets-Sheet 2
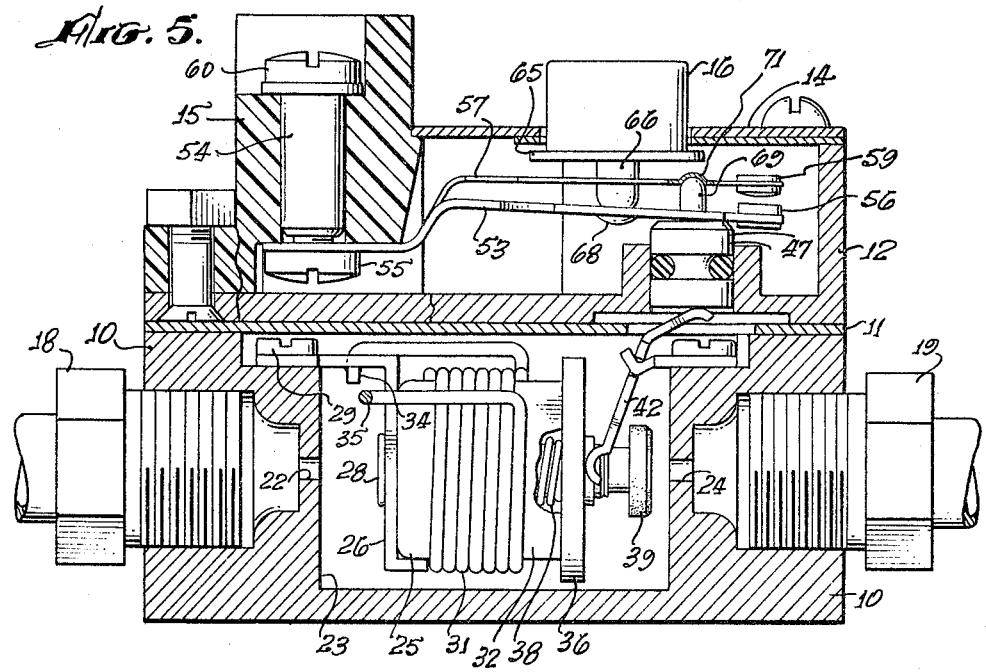
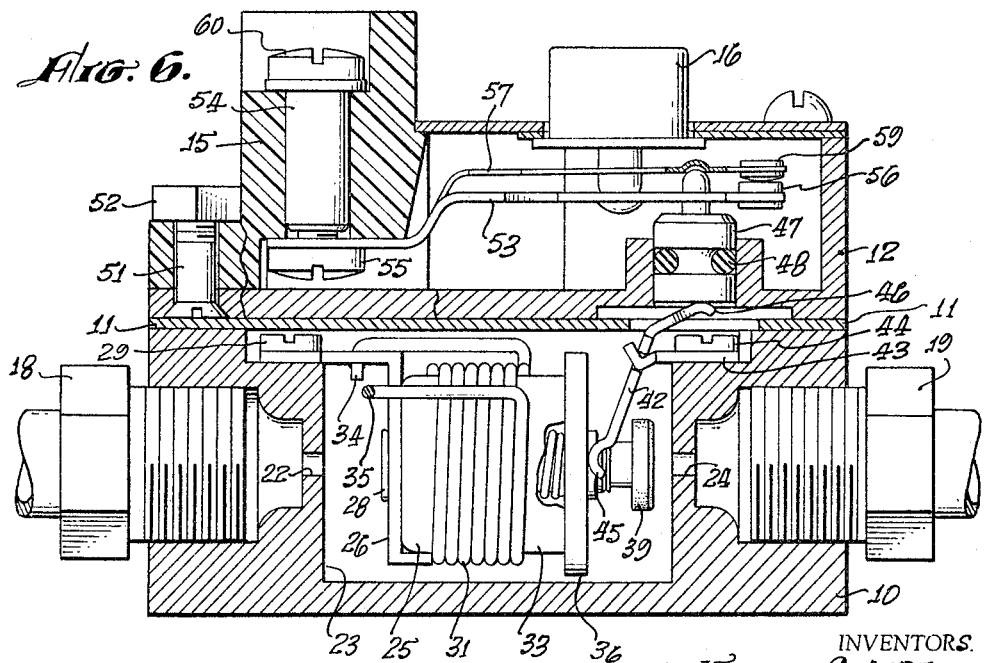
INVENTORS.
HAROLD A. McINTOSH,
HOUSTON REHRIG,
BY THEIR ATTORNEYS
HARRIS, KIECH, RUSSELL & KERN.

United States Patent Office 3,264,421
Patented August 2, 1966

3,264,421
SAFETY CONTROL FOR GAS VALVE
AND THE LIKE
Harold A. McIntosh, South Pasadena, and Houston Rehrig, Pasadena, Calif., assignors to Robertshaw Controls Company, Richmond, Va., a corporation of Delaware
Filed Aug. 2, 1963, Ser. No. 299,590
9 Claims. (Cl. 200—61.86)

This invention relates to safety controls for gas furnaces and other solenoid actuated devices. In a typical gas furnace, the main burner control valve is electrically actuated by means of a solenoid. The solenoid circuit includes a set of contacts which are closed when the pilot burner is in operation and which open when the pilot flame goes out and when other malfunctions occur. Opening of the contact set de-energizes the solenoid circuit and the spring loaded control valve shuts off the gas supply to the main burner.

It is an object of the invention to provide a new and improved safety control for use in conjunction with the pilot thermocouple and the main valve. A further object is to provide such a control which is very small, compact, durable and inexpensive. A particular object is to provide such a safety control having fail safe operating features.

It is an object of the invention to provide a new and improved safety control which may be used in the electrical circuit of the main valve solenoid and which may also be used to control gas flow to the pilot burner when this additional function is desired.

It is a particular object of the invention to provide a safety control including a manual reset member with the manually actuated member and the thermocouple-energized electromagnet interlocked such that the contact set in the solenoid control circuit can be closed only by following a predetermined sequence of operations of the safety control.

It is an object of the invention to provide a safety control for operation with an electrically actuated gas valve and a thermocouple including an electromagnet, means for energizing the electromagnet from a thermocouple, an armature movable into and out of engagement with the electromagnet, spring means for urging the armature out of said engagement, means for urging the armature into said engagement, first and second contact carriers for closing a circuit to a valve solenoid, and a manually actuable member for moving the first carrier in a first direction away from the second carrier and moving the armature moving means to move the armature into engagement with the electromagnet, with the armature moving means moving the second carrier in the opposite direction away from the first carrier when the armature is out of engagement with the electromagnet.

It is a further object to provide such a safety control with the electromagnet mounted in a housing having a gas flow path therethrough and with the armature carrying a valve engageable with a valve seat to control flow through the gas flow path. A further object is to provide a unique magnet and armature construction permitting positioning of the magnet in the gas flow path in a very small housing.

It is a particular object of the invention to provide such a safety control incorporating a pair of contact carriers for interlocking operation by a manual member and a magnet armature member such that any improper operation results in de-energization of the main gas valve.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:
FIG. 1 is a perspective view of the preferred form of the safety control;
FIG. 2 is an electrical diagram illustrating a typical installation of the control;
FIG. 3 is an enlarged sectional view taken along the line 3—3 of FIG. 1 showing the control in the off position;
FIG. 4 is a partial sectional view taken along the line 4—4 of FIG. 3; and
FIGS. 5 and 6 are sectional views corresponding to that of FIG. 3 showing the control in the start position and on position respectively.

The safety control includes a main housing 10, a sealing gasket 11, a contact housing 12, an insulating gasket 13, a cover 14, a terminal block 15, a start button 16, a thermocouple connection 17, and gas line connections 18, 19. Gas flow may be established through the housing in either direction.

An opening 22, a chamber 23 and another opening 24 in the main housing 10 provide a gas flow path through the housing, with the face of the chamber at the opening 24 functioning as a valve seat. An electromagnet and associated armature are positioned in the chamber 23 and spaced from the walls permitting gas flow on all sides thereof. The electromagnet includes a U-shaped magnetic member 25 mounted on a bracket 26 by means of a tube 27 spun over at one end 28, with the bracket 26 mounted on the housing 10 by a screw 29. A conductor 31 is wound on both arms 32, 33 (FIG. 6) of the U-shaped member 25 with one end 34 of the conductor connected to ground at the bracket 26 and the other end 35 connected to the thermocouple connection 17.

The armature includes a disc 36 carried on a pin 37 which slides in the tube 27. A spring 38 about the pin and tube urges the disc away from the electromagnet. A valve 39 is carried on the pin for engaging the valve seat at the opening 24.

A lever 42 is pivotally mounted on a bracket 43 fixed to the housing 10 by a screw 44 (FIG. 6). One end 45 of the lever 42 is forked and engages the armature disc 36 on both sides of the pin 37. The other end 46 of the lever 42 extends through openings in the gasket 11 and contact housing 12, engaging a plunger 47 slidably positioned in the contact housing 12. An O-ring 48 is positioned on the plunger 47 to provide a gas seal at the plunger opening.

The terminal block 15 is made of an electrical insulating material and is mounted on the contact housing 12 by a screw 51 and nut 52. A first contact carrier 53 is mounted at one end in a bushing 54 by a screw 55 and carriers an electrical contact 56 at the other end. A second contact carrier 57 is mounted at one end in a similar bushing by a screw 58 and carries an electrical contact 59 at the other end thereof (FIGS. 4 and 6). Screws 60, 61 provide for making external electrical connections to the contact carriers 53, 57, respectively.

The contact carriers 53, 57 are made of a resilient electrical conducting material such as Phosphor bronze and are disposed in approximately parallel planes. The manually operable start button 16 is retained in an opening in the cover plate 14 by a ridge 65. An extension 66 of the button passes through an opening 67 in the carrier 57 and preferably has a rounded end for engaging a mating dimple 68 in the carrier 53. A similar extension 69 on the plunger 47 projects through an opening 70 in the carrier 53 and preferably has a rounded end for engaging a mating dimple 71 in the carrier 57.

The safety control described above may be installed in a gas furnace in the manner illustrated in FIG. 2. The safety control functions as the pilot valve for controlling flow of gas to the pilot burner. The thermocouple positioned adjacent the pilot burner is connected to the winding 31 of the electromagnet. The room temperature thermostat is connected in series with a transformer winding, the solenoid of the main valve, and the contact set 56, 59 of the safety control. Under normal operating conditions, the pilot burner is on at all times and the thermocouple generates sufficient current to maintain the electromagnet energized, the pilot valve open and the contact set 56, 59 closed. Then actuation of the main valve is controlled by the room thermostat. If the pilot burner goes out, the contact set in the safety control is opened and the main valve solenoid is de-energized. Similarly, any electric power failure will de-energize the solenoid of the main valve and shut off gas applied to the main burner. In one alternative arrangement, the gas supply to the pilot burner may bypass the valve of the safety control, with the safety control acting only to control the electrical energy to the main valve solenoid. When used in this latter application, the gas flow path and/or the valve may be omitted from the safety control.

The safety control is shown in the off condition in FIG. 3. The spring 38 forces the armature to the right, engaging the valve 39 with the valve seat to close the gas flow path through the control. The spring action also rotates the lever 42 counterclockwise and moves the plunger 47 upward into engagement with the second contact carrier 57, moving the contact 59 upward and out of engagement with the contact 56.

The control is operated by manually depressing the button 16 as shown in FIG. 5. Downward movement of the button produces downward movement of the carrier 53 and downward movement of the plunger 47, the button movement being transferred to the plunger by means of the carrier 53. The downward movement of the plunger 47 produces a clockwise rotation of the lever 42, compressing the spring 38 to move the disc 36 into contact with the legs of the electromagnet and the valve 39 away from the valve seat. The pilot burner may now be ignited. The flame of the pilot burner heats the thermocouple and generates a current in the electromagnet sufficient to maintain the disc 36 in contact with the magnet against the action of the spring 38. In conventional systems, about sixty seconds are required to generate the required holding force in the electromagnet. The devices are normally designed so that regardless of the temperature at the thermocouple, the attractive force produced at the electromagnet is not sufficient to move the disc from the position of FIG. 3 to the position of FIG. 5.

The downward movement of the plunger 47 permits corresponding downward movement of the contact carrier 57, but the contact set is not closed because the contact carrier 53 is also being moved downward by actuation of the button 16. Thus the circuit to the solenoid of the main valve is maintained open during this starting operation.

After about sixty seconds, the button 16 may be released and, if the system is functioning properly, the disc 36 will be maintained in contact with the electromagnet, as shown in FIG. 6. The plunger 47 will remain in the downward position of FIG. 5 while the release of the button 16 permits the carrier 53 to move upward and bring the contacts into engagement, as shown in FIG. 6. The solenoid of the main valve may now be controlled by the thermostat or other control device as desired. The contact carrier 53 is preferably formed so that it produces an upward bias force on the start button 16 for all positions of the button. Similarly, the carried 57 is preferably formed so that it produces a downward bias force on the plunger 47 at all times. Then when the button 16 is released from the position of FIG. 5, the carrier 53 will raise the button to the position of FIG. 6 and also bring the contact 56 into firm engagement with the contact 59. The carrier 53 is preferably made stronger than the carrier 57 so that the contacts can be biased toward each other and the button 16 can be moved to the upper position at the same time. The operation of the safety control is completely independent of forces due to gravity and the device may be installed and operated in any orientation.

When the safety control is in the on condition as shown in FIG. 6, depression of the start button 16 will move the carrier 53 down and open the control circuit to the main valve shutting off the main burner. Since depression of the start button maintains the contacts 56, 59 separated, the device cannot be used to operate a burner having a malfunctioning thermocouple or other faulty equipment by mechanically locking the start button in the down or depressed position.

The unique design and arrangement of components of the safety control permit manufacture of a very small and compact unit which meets all of the operating requirements for commercial use in gas fired equipment. One specific embodiment incorporating the structure shown herein has over-all dimensions of one inch by one and one-half inches by two inches.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a safety control for operation with an electrically actuated gas valve and a thermocouple, the combination of:

an electromagnet;
means for energizing said electromagnet from a thermocouple;
an armature movable into and out of engagement with said electromagnet;
spring means for urging said armature out of said engagement;
means for moving said armature into said engagement;
first and second contact carriers for closing a circuit to a valve solenoid; and
a manually actuable member engaging said first carrier and moving said first carrier in a first direction away from said second carrier, said manually actuable member engaging said armature moving means and moving said armature moving means to move said armature into engagement with said electromagnet;
said armature moving means engaging said second carrier and moving said second carrier in the opposite direction away from said first carrier when said armature is out of engagement with said electromagnet.

2. In a safety control for operation with an electrically actuated gas valve and a thermocouple, the combination of:

a housing having a gas flow path therethrough and including a valve seat;
an electromagnet mounted in said housing;
means for energizing said electromagnet from a thermocouple;
an armature movable into and out of engagement with said electromagnet and including a valve for engaging said valve seat and closing said gas flow path when said armature is out of engagement with said electromagnet;
spring means for urging said armature out of said engagement;
means for moving said armature into said engagement;
first and second contact carriers for closing a circuit to a valve solenoid; and
a manually actuable member engaging said first carrier and moving said first carrier in a first direction away from said second carrier, said manually actuable member engaging said armature moving means and moving said armature moving means to move said armature into engagement with said electromagnet;

said armature moving means engaging said second carrier and moving said second carrier in the opposite direction away from said first carrier when said armature is out of engagement with said electromagnet.

3. In a safety control for operation with an electrically actuated gas valve and a thermocouple, the combination of:

an electromagnet;

means for energizing said electromagnet from a thermocouple;

an armature movable into and out of engagement with said electromagnet;

spring means for urging said armature out of said engagement;

means for moving said armature into said engagement;

first and second contact carriers for closing a circuit to a valve solenoid and disposed in approximately parallel planes; and a manually actuable member engaging said first carrier and moving said first carrier in a first direction away from said second carrier, said manually actuable member engaging said armature moving means and moving said armature moving means to move said armature into engagement with said electromagnet;

with said second carrier positioned between said first carrier and said member and with said first carrier directly engaging said armature moving means when moved in said first direction by said member;

said armature moving means engaging said second carrier and moving said second carrier in the opposite direction away from said first carrier when said armature is out of engagement with said electromagnet.

4. In a safety control for operation with an electrically actuated gas valve and a thermocouple, the combination of:

an electromagnet;

means for energizing said electromagnet from a thermocouple;

an armature movable into and out of engagement with said electromagnet;

spring means for urging said armature out of said engagement;

means for moving said armature into said engagement;

first and second contact carriers for closing a circuit to a valve solenoid and disposed in approximately parallel planes, each carrier including means defining an actuating opening therethrough; and a manually actuable member for moving said first carrier in a first direction away from said second carrier and moving said armature moving means to move said armature into engagement with said electromagnet;

with said second carrier positioned between said first carrier and said member with said member passing through said second carrier opening and with said first carrier directly engaging said armature moving means when moved in said first direction by said member;

with a portion of said armature moving means passing through said first carrier opening engaging and moving said second carrier in the opposite direction away from said first carrier when said armature is out of engagement with said electromagnet.

5. In a safety control for operation with an electrically actuated gas valve and a thermocouple, the combination of:

an electromagnet;

means for energizing said electromagnet from a thermocouple;

an armature movable into and out of engagement with said electromagnet;

spring means for urging said armature out of said engagement;

means for moving said armature into said engagement;

first and second resilient contact carriers for closing a circuit to a valve solenoid, with said carriers normally biased into engagement with each other; and a manually actuable member engaging said first carrier and moving said first carrier in a first direction away from said second carrier, said manually actuable member engaging said armature moving means and moving said armature moving means to move said armature into engagement with said electromagnet;

with said normal bias moving said carriers into engagement when said armature is in engagement with said electromagnet and said member is released;

said armature moving means engaging said second carrier and moving said second carrier in the opposite direction away from said first carrier when said armature is out of engagement with said electromagnet.

6. In a safety control for operation with an electrically actuated gas valve and a thermocouple, the combination of:

an electromagnet;

means for energizing said electromagnet from a thermocouple;

an armature movable into and out of engagement with said electromagnet;

spring means for urging said armature out of said engagement;

means for moving said armature into said engagement including a plunger slidable between armature engaged and disengaged positions and having first and second carrier engageable portions;

first and second contact carriers for closing a circuit to a valve solenoid and disposed in approximately parallel planes, each carrier including means defining an actuating opening therethrough; and a manually actuable member passing through said second carrier opening for moving said first carrier in a first direction away from said second carrier with said first carrier engaging said first portion and moving said plunger to move said armature into engagement with said electromagnet;

with said second carrier positioned between said first carrier and said member and with said second portion of said plunger passing through said first opening and moving said second carrier to the opposite direction away from said first carrier when in said armature disengaged position.

7. In a safety control for operation with an electrically actuated gas valve and a thermocouple, the combination of:

a housing having a gas flow path therethrough and including a valve seat;

a U-shaped magnet having an electrical winding on each arm thereof for connection to a thermocouple;

means for mounting said magnet in said housing flow path for gas flow therearound;

a combination armature and valve member;

means for mounting said member for movement along said flow path between a first position with the valve thereof engaging said valve seat and a second position with the armature thereof engaging the ends of the arms of said magnet;

a spring urging said member to said first position;

a lever pivotally mounted in said housing for moving said member to said second position;

a contact set for closing a circuit to a valve solenoid; and means for coupling said lever to said contact set for maintaining said set in the open circuit condition when said member is in said first position.

8. In a safety control for operation with an electrically actuated gas valve and a thermocouple, the combination of:
- a housing having a gas flow path therethrough and including a valve seat;
- a U-shaped magnet having an electrical winding on each arm thereof for connection to a thermocouple;
- means for mounting said magnet in said housing flow path for gas flow therearound;
- a combination armature and valve member;
- means for mounting said member for movement along said flow path between a first position with the valve thereof engaging said valve seat and a second position with the armature thereof engaging the ends of the arms of said magnet;
- a spring urging said member to said first position;
- a lever pivotally mounted in said housing and having a first end slidingly engaging said member for moving said member to said second position and having a second end for slidingly engaging a plunger;
- first and second contact carriers for closing a circuit to a valve solenoid;
- a manually actuable member engaging said first carrier and moving said first carrier in a first direction away from said second carrier; and
- a plunger slidably mounted in said housing and coupling said first carrier to said lever to move said combination armature and valve member to said second position;
- with said plunger engaging said second carrier for moving said second carrier in the opposite direction away from said first carrier when said combination armature and valve member is in said first position.

9. A switch for a safety control or the like including in combination:
- a housing;
- a plunger slidable in said housing between first and second positions and having first and second carrier engageable portions;
- first and second contact carriers for closing a circuit and disposed in approximately parallel planes, each carrier including means defining an actuating opening therethrough; and
- a manually actuable member passing through said second carrier opening engaging said first carrier and moving said first carrier in a first direction away from said second carrier with said first carrie engaging said fist portion and moving said plunger to said first position;
- with said second carrier positioned between said first carrier and said member and with said second portion of said plunger passing through said first opening engaging and moving said second carrier in the opposite direction away from said first carrier when in said second position.

References Cited by the Examiner

UNITED STATES PATENTS

| 2,237,577 | 4/1941 | Ray | 158—131 |
| 2,691,705 | 10/1954 | Ray | 200—61.86 |
| 3,195,553 | 7/1965 | Rice | 137—66 |

BERNARD A. GILHEANY, *Primary Examiner.*

B. DOBECK, *Assistant Examiner.*